United States Patent [19]
Wolter et al.

[11] Patent Number: 5,919,885
[45] Date of Patent: Jul. 6, 1999

[54] COVALENTLY AND NUCLEOPHILICALLY SELF-CURING SYSTEMS

[75] Inventors: Herbert Wolter, Gerchsheim-Grossrinderfeld; Werner Storch, Wuezburg, both of Germany

[73] Assignee: Fraunhofer-Gesellschaft Zur Foerderung Der Angewandten Forschung e.V., Munich, Germany

[21] Appl. No.: 08/967,754

[22] Filed: Nov. 10, 1997

Related U.S. Application Data

[63] Continuation of application No. 08/391,691, Feb. 21, 1995, abandoned.

[30] Foreign Application Priority Data

Feb. 18, 1994 [DE] Germany ............................ 44 05 261

[51] Int. Cl.$^6$ ............................................ C08G 77/20
[52] U.S. Cl. ............................ 528/32; 528/30; 528/41; 526/279
[58] Field of Search ...................... 528/32, 30, 41; 526/279

[56] References Cited

U.S. PATENT DOCUMENTS

| | | | |
|---|---|---|---|
| 3,440,302 | 4/1969 | Speier et al. | 260/825 |
| 4,491,650 | 1/1985 | Rizk et al. | 525/102 |
| 4,579,782 | 4/1986 | Kumar et al. | 428/473.5 |
| 4,625,007 | 11/1986 | Ellis et al. | 526/279 |
| 4,698,406 | 10/1987 | Lo et al. | 528/12 |
| 4,754,012 | 6/1988 | Yoldas et al. | 528/10 |
| 4,997,965 | 3/1991 | Lohmann et al. | 556/419 |
| 5,079,312 | 1/1992 | Isozaki et al. | 525/479 |
| 5,233,006 | 8/1993 | Wolter et al. | 528/32 |
| 5,532,398 | 7/1996 | Wolter et al. | 528/32 |

FOREIGN PATENT DOCUMENTS

| | | |
|---|---|---|
| 0 230342 A2 | 7/1987 | European Pat. Off. . |
| 0 291 452 | 11/1988 | European Pat. Off. . |
| 0 451 709 | 10/1991 | European Pat. Off. . |
| 27 58 414 | 7/1979 | Germany . |
| 27 58 415 | 7/1979 | Germany . |
| 30 11 761 | 10/1981 | Germany . |
| 34 07 087 | 9/1985 | Germany . |
| 38 26 715 | 2/1990 | Germany . |
| 38 35 968 | 6/1990 | Germany . |
| 39 27 667 | 2/1991 | Germany . |
| 40 02 922 | 8/1991 | Germany . |
| 40 11 044 | 10/1991 | Germany . |
| 41 25 201 | 10/1992 | Germany . |
| 83/03418 | 10/1983 | WIPO . |

OTHER PUBLICATIONS

Endo et al., "New Acrylates and Methacrylates Bearing Pendant Spiro Ortho Ester Groups", J.Polymer Sci.: Part C: Polymer Letters, vol. 26, pp. 517–520, 1988.

Haase et al., "Synthese von Methacryloyl–Spiroorthoestern", J. f. prakt. Chemie, vol. 330, No. 2, pp. 316–318, 1988.

*Primary Examiner*—Melvyn I. Marquis
*Attorney, Agent, or Firm*—Foley & Lardner

[57] ABSTRACT

Covalently and nucleophilically self-curing systems are described which are based on polymerizable and hydrolytically condensable or condensed silicon compounds, which comprise two components, 1 and 2, and which may also comprise one or more conventional additives or fillers, additional copolymerizable monomers or oligomers, additional hydrolytically condensable or condensed compounds of silicon or both, and other elements from the group consisting of Al, Ti, Zr, B, P, Sn, Pb, the transition metals, the lanthanides and the actinides. One component comprises one or more silicon compounds of the formula I, optionally in (pre)condensed form $$\{X_aR_bSi[(R'A)_c]_{(4-a-b)}\}_xB \qquad (I)$$

and the second component comprises one or more compounds containing at least one substituted or unsubstituted amino group or both. In particular, covalently and nucleophilically self-curing systems are described which are based on acrylates or methacrylates or both. Also described is the preparation of these systems and their use.

24 Claims, No Drawings

COVALENTLY AND NUCLEOPHILICALLY SELF-CURING SYSTEMS

This application is a continuation of application Ser. No. 08/391,691, filed Feb. 21, 1995 now abandoned.

FIELD OF THE INVENTION

The invention relates generally to covalently and nucleophilically self-curing systems based on polymerizable and hydrolytically condensable or condensed silicon compounds. More particularly, the systems according to the invention comprise two components, a component 1 and a component 2, and may comprise one or more conventional additives, fillers, additional copolymerizable monomers or oligomers, additional hydrolytically condensable or condensed compounds of silicon, and elements from the group consisting of Al, Ti, Zr, B, P, Sn, Pb, the transition metals, the lanthanides and the actinides. The invention relates furthermore to the preparation of these systems and to their use. The present invention relates more particularly to covalently and nucleophilically self-curing systems based on acrylates or methacrylates, or both, and to the preparation and use thereof.

RELATED ART

A large number of self-curing plastics have been known for sometime. Systems of this type find wide applicability, for example, as casting compositions, adhesives, sealing compositions, coating compositions, in shaping processes, for the manufacture of fillers, as a composite or binder, in molding and bonding technology and for the production of fibers or films, etc. Because of this multiplicity of possible applications, however, there is also a continual requirement for modification of the existing systems, in order thereby, on the one hand, to open up new applications and, on the other hand, to optimize still further the properties of the systems for specific intended utilities.

Self-curing systems comprise one or more components and contain, inter alia, reactive monomers which are polymerized, and thereby cured, by a variety of initiator/activator systems. In the case of two-component materials, for example, one component contains an activator and the second component contains an initiator, and, when the two components are brought together and mixed, the reactive monomers polymerize and the system cures. Examples of the compounds employed are, as reactive monomers, acrylates and methacrylates of various structural types; as activators, aromatic amines such as N,N-dimethyl-p-toluidine; and, as initiators, dibenzoyl peroxide (DBP). This system, then, involves free-radical polymerization and curing. Further initiator/activator systems are also known.

As conventional additives, for example, pigments, stabilizers, plasticizers or impact modifiers, and also a wide selection of fillers, are added to the self-curing systems.

A critical disadvantage of the prior known self-curing systems based on acrylates or methacrylates lies in the methacrylate and acrylate monomers. Low molecular weight acrylate and methacrylate monomers, in particular, not only give rise to strong odor pollution but also often have an acute toxic action.

A further serious disadvantage of the self-curing systems of the prior art is that, when the activators used are amines, the latter are still present in the system after curing and are volatile, leading to serious toxicological problems and, in particular, rendering the application of the self-curing systems to medical uses virtually impossible.

Owing to the many different uses of self-curing systems and the great range of requirements placed on them, there is an important need for improved self-curing systems.

SUMMARY OF THE INVENTION

The object of the present invention is therefore to provide new and improved self-curing systems. The intention is that these systems should be universally applicable, easy to handle, and flexible within the processing or application time; that is, they should have a short, adjustable curing time of between one and about thirty minutes. Thus, for example, self-curing systems for adhesive bonds should cure rapidly, and those for the production of moldings should cure slowly. Furthermore, it should be possible to provide these systems with additives and fillers, and to mix them in widely varying proportions with heat-curable and/or UV-curable systems or components. Furthermore, these systems should be able to be incorporated into an organic-inorganic network, and the components of the system, especially the reactive monomers, should give no cause for concern on toxicological grounds.

A further object of the present invention is the provision of self-curing systems which can be cured with toxicologically acceptable activators, enabling the use of these systems in the field of medicine.

These objects and other object readily apparent to those skilled in the art can be achieved by providing a covalently and nucleophilically self-curing composition systems based on polymerizable and hydrolytically condensable and/or hydrolytically condensed silicon compounds. The covalently and nucleophilically self-curing systems according to the invention comprise two components, a component 1 and a component 2, and the system may also comprise one or more conventional additives, fillers, additional polymerizable monomers or oligomers, additional hydrolytically condensable or condensed compounds of silicon, and other elements from the group consisting of Al, Ti, Zr, B, P, Sn, Pb, the transition metals, the lanthanides and the actinides. In the inventive system, component 1 comprises one or more silicon compounds of the formula I, if desired in (pre) condensed form,

wherein the radicals and indices are identical or different and
A is O, S, PR", POR", NHC(O)O or NHC(O)NR",
B is a straight-chain or branched organic radical which is derived from a compound B' having at least one (for c=1 and A=NHC(O)O or NHC(O)—NR") or at least two C═C double bonds and 5 to 50 carbon atoms,
R is alkyl, alkenyl, aryl, alkylaryl or arylalkyl,
R' is alkylene, arylene or alkylenearylene,
R" is hydrogen, alkyl or aryl,
X is hydrogen, halogen, hydroxyl, alkoxy, acyloxy, alkylcarbonyl, alkoxycarbonyl or NR"$_2$,
where
a is 1, 2 or 3
b is 0, 1 or 2
c is 0 or 1, and
x is an integer whose maximum value corresponds to the number of double bonds in the compound B' minus 1, or is equal to the number of double bonds in the compound B' if c=1 and A is NHC(O)O or NHC(O)NR",
in which the above alkyl and alkenyl radicals are optionally substituted straight-chain, branched or cyclic radicals having 1 or, respectively, 2 to 20 carbon atoms, aryl is optionally substituted phenyl, naphthyl or biphenyl, and the above alkoxy, acyloxy, alkylcarbonyl, alkoxycarbonyl, alkylaryl, arylalkyl, arylene, alkylene and alkylenearylene radicals are derived from the above-defined alkyl and aryl radicals, and component 2 comprises one or more compounds containing at least one substituted or unsubstituted amino group.

DESCRIPTION OF THE PREFERRED EMBODIMENTS

It has been found unexpectedly that the silanes of formula I are outstandingly suitable for use as reactive monomers in covalently and nucleophilically self-curing systems. Following the addition of compounds containing amino groups, the C=C double bonds of the silane-bonded radicals B enable rapid curing by way of an organic, ionic polyaddition reaction, it being possible to control the rate of reaction, i.e. the rate of curing, by way of the reactivity of the C=C double bond (methacrylate←→acrylate) or by way of the reactivity of the amines, i.e., by means of their substitution (e.g. primary←→secondary, aliphatic←→aromatic). Moreover, the curing time can also be controlled by way of the number of crosslinkable components or of crosslinkable groups, for example the acrylate groups, or by way of the number of amino groups. It is therefore possible to employ the systems according to the invention both for the production of moldings, where long curing times are required, and for adhesive bonds, where the requirement is for rapid curing. Thus the systems according to the invention contain within them a rich potential for variation with respect to their utility.

A further advantage of the systems according to the invention is that the silylalkoxy groups of the silanes of the formula I offer the possibility of constructing an inorganic network in accordance with the principles of the sol-gel process, and further inorganically crosslinking components can be incorporated into this network, so that this network can be varied within wide limits and can be adapted simply and universally to the requirements of the particular application.

Yet another advantage of the systems according to the invention is that, by way of the silylalkoxy groups and by way of the C=C double bonds of the silanes of the formula I, an organic-inorganic network is constructed which can likewise be varied within wide limits and can likewise be adapted simply and universally to the requirements of the particular application. Thus, for example, further copolymerizable, self-curing and heat-curable and/or UV-curable monomers can be added to the systems according to the invention in order thereby to adapt the chemical and physical properties of these systems to the requirements of the particular application.

In the covalently and nucleophilically self-curing systems according to the invention, materials are made available which make it possible to prepare inorganic-organic composite polymers having a very wide variety of properties. These various properties can be adjusted, for example, by way of the structural conditions within the silanes of the formula I which are employed, by means of the structural conditions within the amines employed, and by means of the structural conditions of the copolymerizable monomers or of the further cohydrolyzable components.

The covalently and nucleophilically self-curing systems according to the invention can be employed either as such or in the form of solutions in the technology of bonding (e.g. of optoelectronic components) as bonding agents or adhesion promoters for the wide variety of substrates, and also for the surface sealing of conventional composites, as adhesives, composites, bulk materials, as casting, sealing and coating compositions, or in shaping processes, and in molding technology (e.g. in the replica technique). The systems according to the invention can also be employed for the production of fibers, films or fillers. Furthermore, when reactive acrylate and/or methacrylate groups are employed, rapid and complete curing is made possible, and it is possible to control the curing times by way of the number and reactivity of these groups. In addition, it is possible to combine self-curing with, for example, photoinduced and/or thermal curing.

A further great advantage of the self-curing systems according to the invention over the prior art is that polymerizable toxic monomers, for example, toxic acrylates or methacrylates are bonded firmly to the silanes of the formula I and are thus embedded firmly in the inorganic-organic network, so that even in the case of incomplete polymerization it is not possible for any free monomers to be present after curing. In the case of the self-curing systems of the prior art, based on acrylates or methacrylates, however, there is always the danger that incomplete polymerization will result in the continued presence of free monomers after curing, which monomers may lead to considerable toxicity problems.

It is therefore also possible to employ the systems according to the invention in the medical sector. One possible application is, for example, their use as a filling material for intraocular lenses in treatment to counter cataract and other eye diseases. For further details, reference is made to DE 3927667 A1.

The silanes of the formula I can be polymerized, or reacted by addition, by way of the radicals B, and can be hydrolyzed by way of the radicals X. By way of the hydrolyzable groups it is possible to construct an inorganic network containing Si—O—Si units, whereas the double bonds present in the radical B give rise to an organic network by polymerizing and/or undergoing a polyaddition reaction with the amines of component 2.

The alkyl radicals are, for example, straight-chain, branched or cyclic radicals having 1 to 20, in particular having 1 to 10, carbon atoms, and are preferably lower alkyl radicals having 1 to 6, particularly preferably having 1 to 4, carbon atoms. Specific examples are methyl, ethyl, n-propyl, isopropyl, n-butyl, isobutyl, s-butyl, t-butyl, n-pentyl, n-hexyl, cyclohexyl, 2-ethylhexyl, dodecyl and octadecyl.

The alkenyl radicals are, for example, straight-chain, branched or cyclic radicals having 2 to 20, preferably having 2 to 10, carbon atoms, and are preferably lower alkenyl radicals having 2 to 6 carbon atoms, such as vinyl, allyl and 2-butenyl.

Preferred aryl radicals are phenyl, biphenyl and naphthyl. The alkoxy, acyloxy, alkylamino, dialkylamino, alkylcarbonyl, alkoxycarbonyl, arylalkyl, alkylaryl, alkylene and alkylenearylene radicals are preferably derived from the above-mentioned alkyl and aryl radicals. Specific examples are methoxy, ethoxy, n- and isopropoxy, n-, iso-, s- and t-butoxy, monomethylamino, mono-ethylamino acetyloxy, propionyloxy, methylcarbonyl, N-ethylcarbonyl, methoxycarbonyl, ethoxycarbonyl, benzyl, 2-phenylethyl and tolyl.

The abovementioned radicals may, if desired, carry one or more substituents, examples being halogen, alkyl, hydroxyalkyl, alkoxy, aryl, aryloxy, alkylcarbonyl, alkoxycarbonyl, furfuryl, tetrahydrofurfuryl, amino, monoalkylamino, dialkylamino, trialkylammonium, amido, hydroxyl, formyl, carboxyl, mercapto, cyano, isocyanato, nitro, epoxy, $SO_3H$ or $PO_4H_2$.

Among the halogens, fluorine, chlorine and bromine are preferred, especially chlorine.

Where integer a is $\geq 2$ or integer b=2, the radicals X and R may at each occurrence have the same or a different meaning.

In preferred embodiments of the self-curing systems according to the invention, the radicals X, R, R', A, a, b, c and x in the general formula I are defined as follows:

X: $(C_1-C_4)$-alkoxy, in particular methoxy and ethoxy; or halogen, in particular chlorine;

R: $(C_1-C_4)$-alkyl, in particular methyl and ethyl;

R': $(C_1-C_4)$-alkylene, in particular methylene and propylene;

A: O, S or NHC(O)O, in particular S or NHC(O)O;

a: 1, 2 or 3;

c: 0 or 1, preferably 1;

4-a-b: 0 for c=0 and 1 for c=1;

x: 1 or 2.

In particularly preferred embodiments of the systems according to the invention, the structural unit with the integer x in the general formula I is selected from triethoxysilyl, methyldiethoxysilyl, methyldichlorosilyl, 3-methyldimethoxysilylpropylthio, 3-triethoxysilylpropylthio, ethoxydimethylsilylmethylthio, methyldiethoxysilylmethylthio or 3-triethoxysilylpropylurethane.

The radical B in the general formula I is derived from a substituted or unsubstituted compound B' having at least one or having at least two C═C double bonds, for example having vinyl, allyl, acrylic and/or methacrylic groups, and having 5 to 50, preferably having 6 to 30, carbon atoms. B is preferably derived from a substituted or unsubstituted compound B' having two or more acrylate and/or methacrylate groups. Such compounds are referred to below as (meth)acrylates.

If the compound B' is substituted, the substituents may be chosen from the abovementioned substituents.

In further preferred embodiments of the systems according to the invention, silanes of the general formula I are employed in which B is derived from acrylic esters of trimethylolpropane, pentaerythritol, dipentaerythritol, $C_2-C_4$-alkanediols, for example from glycerol (e.g. glycerol dimethacrylate), polyethylene glycols, polypropylene glycols or from optionally substituted and/or alkoxylated bisphenol A.

Further details and specific examples of silanes of the general formula I and their preparation can be found in EP 0 451709 A2 and DE 4011044 C2.

In addition to the silanes of the formula I, it is also possible to use other hydrolytically condensable compounds of silicon or of other elements in the group consisting of Al, Ti, Zr, B, P, Sn, Pb, the transition metals, the lanthanides and the actinides, either as such or already in (pre)condensed form, for the preparation of the systems according to the invention.

It is preferred that, of the starting materials, at least 50 mol %, preferably at least 80 mol % and most preferably at least 90 mol %, based on monomeric compounds, are silicon compounds. It is also preferred for the systems according to the invention to be based on at least 10 mol %, for example from 25 to 100 mol %, preferably from 50 to 100 mol % and most preferably from 75 to 100 mol %, based in each case on monomeric compounds, of one or more of the silanes of the general formula I.

The hydrolytically condensable silicon compounds which are different from the silanes of the general formula I and which may be employed if desired are preferably those of the general formula VII, $$R_x(R^2Z)_ySiX_{4-(x+y)} \quad (VII)$$

wherein the radicals R, $R^2$ and Z are identical or different and are defined as follows:

R=alkyl, alkenyl, aryl, alkylaryl or arylalkyl, $R^2$=alkylene or alkenylene, it being possible for these radicals to be interrupted by oxygen or sulfur atoms or —NH groups, X=hydrogen, halogen, hydroxyl, alkoxy, acyloxy, alkylcarbonyl, alkoxycarbonyl or $NR''_2$, where R''=hydrogen, alkyl or aryl, Z=halogen or an optionally substituted amino, amide, aldehyde, alkylcarbonyl, carboxyl, mercapto, cyano, alkoxy, alkoxycarbonyl, sulfonic acid, phosphoric acid, acryloyloxy, methacryloyloxy, epoxy or vinyl group, x=0, 1, 2 or 3, y=0, 1, 2 or 3, where x+y=1, 2 or 3.

Silanes of the general formula VII are either commercially available or can be prepared by known methods; cf. W. Noll "Chemie and Technologie der Silicone", [Chemistry and Technology of Silicones], Verlag Chemie GmbH, Weinheim/BergstraBe (1968). Reference is made moreover to German Patents DE 4011044 C2 and DE 3407087 C2.

The alkyl radicals are, for example, straight-chain, branched or cyclic radicals having 1 to 20, preferably having 1 to 10 carbon atoms, and are particularly preferably lower alkyl radicals having 1 to 6 carbon atoms. Specific examples are methyl, ethyl, n-propyl, isopropyl, n-butyl, s-butyl, t-butyl, isobutyl, n-pentyl, n-hexyl, cylcohexyl, 2-ethylhexyl, dodecyl and octadecyl.

The alkenyl radicals are, for example, straight-chain, branched or cyclic radicals having 2 to 20, preferably having 2 to 10, carbon atoms, and are particularly preferably lower alkenyl radicals having 2 to 6 carbon atoms, such as vinyl, allyl or 2-butenyl.

Preferred aryl radicals are phenyl, biphenyl and naphthyl. The alkoxy, acyloxy, alkylcarbonyl, alkoxycarbonyl and amino radicals are preferably derived from the abovementioned alkyl and aryl radicals. Specific examples are methoxy, ethoxy, n- and isopropoxy, n-, iso-, s- and t-butoxy, methylamino, ethylamino, dimethylamino, diethylamino, N-ethylanilino, acetyloxy, propionyloxy, methylcarbonyl, ethylcarbonyl, methoxycarbonyl, ethoxycarbonyl, benzyl, 2-phenylethyl and tolyl.

The abovementioned radicals may carry one or more substituents, examples being halogen, alkyl, hydroxyalkylalkoxy, aryl, aryloxy, alkylcarbonyl, alkoxycarbonyl, furfuryl, tetrahydrofurfuryl, amino, alkylamino, dialkylamino, trialkylammonium, amido, hydroxyl, formyl, carboxyl, mercapto, cyano, isocyanato, nitro, epoxy, $SO_3H$ and $PO_4H_2$.

Among the halogens, fluorine, chlorine and bromine are preferred.

Specific examples of hydrolytically condensable silanes of the general formula VII are:

$CH_3$—Si—$Cl_3$, $CH_3$—Si—$(OC_2H_5)_3$, $C_2H_5$—Si—$Cl_3$, $C_2H_5$—Si—$(OC_2H_5)_3$, $CH_2$═CH—Si—$(OC_2H_5)_3$,

CH$_2$=CH—Si—(OC$_2$H$_4$OCH$_3$)$_3$, (CH$_3$)$_2$—Si—Cl$_2$, CH$_2$=CH—Si—(OOCCH$_3$)$_3$, (CH$_3$)$_2$—Si—(OC$_2$H$_5$)$_2$, (CH$_2$H$_5$)$_3$—Si—Cl, (C$_2$H$_5$)$_2$—Si—(OC$_2$H$_5$)$_2$, (CH$_3$)$_2$(CH$_2$=CH)—Si—Cl$_2$, (CH$_3$)$_3$—Si—Cl, (t—C$_4$H$_9$)(CH$_3$)$_2$—Si—Cl, (CH$_3$O)$_3$—Si—C$_3$H$_6$—NH—C$_2$H$_4$—NH$_2$, (CH$_3$O)$_3$—Si—C$_3$H$_6$—SH, (CH$_3$O)$_3$—Si—C$_3$H$_6$—NH—C$_2$H$_4$—NH$_2$, (CH$_3$O)$_3$—Si—C$_3$H$_6$—Cl, (CH$_3$O)$_3$—Si—C$_3$H$_6$—O—C(O)—(CH$_3$)=CH, (CH$_3$)$_2$(CH$_2$=CH—CH$_2$)—Si—Cl, (C$_2$H$_5$O)$_3$—Si—C$_3$H$_6$—NH$_2$,

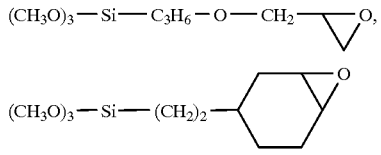

Moreover, the hydrolytically condensable silicon compounds which are different from silanes of the general formula I and which may be employed if desired are likewise preferably those of the general formula VIII $$Y_nSiX_mR_{4-(n+m)} \quad \text{(VIII)}$$

wherein the radicals X, Y and R are identical or different and are defined as follows:
R=alkyl, alkenyl, aryl, alkylaryl or arylalkyl,
X=hydrogen, halogen, hydroxyl, alkoxy, acyloxy, alkylcarbonyl, alkoxycarbonyl or NR"$_2$, where R"=hydrogen, alkyl or aryl,
Y=a substituent which contains a substituted or unsubstituted 1,4,6-trioxaspiro[4.4]nonane radical,
n=1, 2 or 3,
m=1, 2 or 3, with n+m≦4.

Like the silanes of the general formula I, the silanes of the general formula VIII are hydrolyzable and polymerizable and can be incorporated like the silanes of the formula I into an organic-inorganic network. Furthermore, silanes of the general formula VIII are stable compounds which can be hydrolyzed and condensed in basic medium without the Spiro complex being prematurely opened. In addition they offer the great advantage of influencing the shrinkage behavior during curing of the systems according to the invention, i.e., during polymerization, in such a way that little or no shrinkage occurs, and even expansion is possible.

The radicals X and R of the general formula VIII are defined as in the general formula VII. Further details and specific examples of silanes of the general formula VIII and their preparation can be found in DE 4125201 C1.

Among the hydrolyzable aluminum compounds which are used if desired for the preparation of the systems according to the invention, those which are particularly preferred have the general formula IX $$AlR°_3 \quad \text{(IX)}$$

in which the radicals R°, which are identical or different, are selected from halogen, alkoxy, alkoxycarbonyl and hydroxyl. With respect to the more preferred definitions of these radicals, reference may be made to the comments made in connection with the suitable hydrolyzable silicon compounds. The groups just mentioned can also be replaced, in whole or in part, by chelate ligands (e.g. acetylacetone or acetoacetates, acetic acid).

Particularly preferred aluminum compounds are aluminum alkoxides and aluminum halides. Concrete examples which can be mentioned in this connection are Al(OCH$_3$)$_3$, Al(OC$_2$H$_5$)$_3$, Al(O—n—C$_3$H$_7$)$_3$, Al(O—i—C$_3$H$_7$)$_3$, Al(OC$_4$H$_9$)$_3$, Al(O—i—C$_4$H$_9$)$_3$, Al(O—s—C$_4$H$_9$)$_3$, AlCl$_3$, and AlCl(OH)$_2$. Particular preference is given to compounds which are liquid at room temperature, for example, aluminum sec-butylate and aluminum isopropylate.

Suitable hydrolyzable titanium and zirconium compounds that can be employed in accordance with the invention are those of the general formula X $$MX_kR_1 \quad \text{(X)}$$

wherein M is titanium or zirconium, and the radicals R and X are identical or different and are defined as in the case of the general formula I. This also applies to the preferred definitions wherein k is an integer from 1 to 4, in particular from 2 to 4, and 1 is 0, 1, 2 or 3, preferably 0, 1 or 2. Particularly preferred among the compounds of the formula X are those in which k is 4.

As in the case of the above Al compounds, it is also possible to employ complexed Ti or Zr compounds. Additional preferred complexing agents in this case are acrylic acid and methacrylic acid.

Specific examples of Zr and Ti compounds which can be employed are TiCl$_4$, Ti(OC$_2$H$_5$)$_4$, Ti(OC$_3$H$_7$)$_4$, Ti(O—i—C$_3$H$_7$)$_4$, Ti(OC$_4$H$_9$)$_4$, Ti(2-ethylhexoxy)$_4$, ZrCl$_4$, Zr(OC$_2$H$_5$)$_4$, Zr(OC$_3$H$_7$)$_4$, Zr(O—i—C$_3$H$_7$)$_4$, Zr(OC$_4$H$_9$)$_4$, Zr(2-ethylhexoxy)$_4$ and ZrOCl$_2$.

Further hydrolyzable compounds which can be employed for the preparation of the systems according to the invention are, for example, boron trihalides and boric esters, for example BCl$_3$, B(OCH$_3$)$_3$ and B(O2H$_5$)$_3$, tin tetrahalides and tin tetraalkoxides, for example SnCl$_4$ and Sn(OCH$_3$)$_4$, and vanadyl compounds, such as VOCl$_3$ and VO(OCH$_3$)$_3$.

By using, in accordance with the invention, hydrolyzable compounds which are different from silicon compounds it is possible to incorporate heteroatoms into the inorganic network and thus to adapt the properties of the systems according to the invention to the requirements of the particular application, for example with respect to X-ray opacity, thermal extension, etc.

Component 2 of the systems according to the invention comprises one or more compounds containing one or more substituted or unsubstituted amino groups. After mixing the two components 1 and 2 the curing of the systems according to the invention is initiated by an organic, ionic polyaddition step, in which the amino groups are added on to the C=C double bonds of the radicals B of the silanes of the general formula I.

If component 2 comprises only compounds having in each case one amino group, then in order to ensure crosslinking these preferably should be primary amino groups. Two-fold addition to the C=C double bonds takes place, resulting in a very short linking chain (1 atom). In all other cases, both primary and secondary amino groups can be present. The reaction mechanism for self-curing, that is for obtaining an ionically crosslinked polymer, is illustrated in more detail using as an example a (meth)acrylate (component 1) and a diamine Component 1 + Component 2

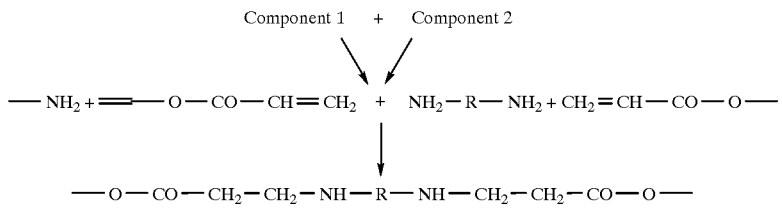

In a preferred embodiment, component 2 comprises one or more compounds having at least two substituted and/or unsubstituted amino groups. Such compounds are included, for example, by the general formula (II),

 (II)

in which the radicals R" are identical or different and are hydrogen, alkyl or aryl, $R^3$ is an optionally substituted alkylene, arylene, arylenealkylene or alkylenearylene radical having 1 to 20 carbon atoms, which is straight-chain, branched or cyclic, and in which aryl is optionally substituted phenyl, naphthyl or biphenyl and in which the amino groups are located on one carbon atom or on different carbon atoms.

Without restriction as to the general nature of diamines of the formula II, specific examples of the latter are: diaminoacetone, diaminoacridine, diaminoadamantane, diaminoanthraquinone, benzidine, diaminobenzoic acid, phenylenediamine, diaminobenzophenone, diaminobutane, diaminocylcohexane, diaminodecane, diaminodicyclohexylmethane, diaminodimethoxybiphenyl, diaminodimethylhexane, diaminodimethylpropane, diaminodiphenylmethane, diaminododecane, diaminoheptane, diaminohexane, diaminomenthane, diaminomesitylene, diaminomethylpentane, diaminomethylpropane, naphthylenediamine, diaminoneopentane, diaminononane, diaminooctane, diaminopentane, diaminophenanthrene, diaminopropane, diaminopropanol, diaminopurine, diaminopyridine and diaminopyrimidine.

Depending on the nature of the radicals $R^3$, polymers having a very wide variety of properties are formed. Thus, for example, aliphatic linking units, for instance in $NH_2—CH_2—CH_2—NH_2$ or $NH_2—(CH_2)_3—NH_2$ up to $NH_2—(CH_2)_{12}—NH_2$, lead to copolymers which have increasing flexibility (i.e. a decreasing modulus of elasticity) as the length of the linking unit rises. More rigid linking units, for example in $NH_2—C_6H_4—NH_2$, $NH_2—C_6H_4—O—C_6H_4—NH_2$, $NH_2—C_6H_4—C(CH_3)_2—C_6H_4—NH_2$ or $NH_2—C_6H_4—SO_2—C_6H_4—NH_2$, result in copolymers of greater rigidity.

In further preferred embodiments, component 2 of the systems according to the invention comprises one or more triamines of the general formula (III)

(III)

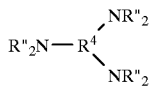

in which the radicals R" are identical or different and are hydrogen, alkyl or aryl, $R^4$ is an optionally substituted alkylene, arylene, arylenealkylene or alkylenearylene radical having 1 to 20 carbon atoms, which is straight-chain, branched or cyclic, in which aryl is optionally substituted phenyl, naphthyl or biphenyl and in which the amino groups are located on three carbon atoms, on two carbon atoms or on one carbon atom, and/or one or more tetraamines of the general formula (IV), (IV)

in which the radicals R" are identical or different and are hydrogen, alkyl or aryl, $R^5$ is an optionally substituted alkylene, arylene, arylenealkylene or alkylenearylene radical having 1 to 20 carbon atoms, which is straight-chain, branched or cyclic, in which aryl is optionally substituted phenyl, naphthyl or biphenyl and in which the amino groups are located on four, on three or on two different carbon atoms.

Amines of the formulae III and IV represent a highly crosslinking, three-dimensional linking unit and lead to copolymers which have a relatively high crosslinking density and which are therefore of relatively high rigidity and hardness.

In further preferred embodiments of the systems according to the invention component 2 comprises, as compound (s) containing amino groups, silanes of the general formula V and/or VI.

 (V)

 (VI)

in each of which the radicals X, R' and R" are identical or different and are defined as for formula I, with a being 1, 2 or 3.

The object of the provision of self-curing systems which are toxicologically acceptable can be achieved by the combination of silanes of the general formula I with silane-bonded amines of the general formula V or VI. Without restriction of the general nature of these amines, concrete examples of the latter are

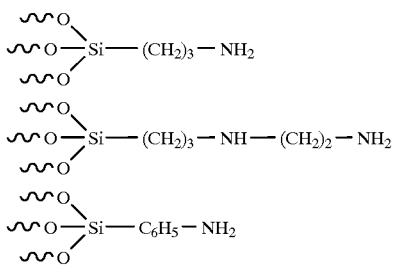

Further examples are 4-aminobutyldimethylmethoxysilane, 4-aminobutyltriethoxysilane, (aminoethylaminomethyl) phenylethyltrimethoxysilane, N-(2-aminoethyl)-3-aminopropylmethyldimethoxysilane, N-(2-aminoethyl-3-aminopropyl)trimethoxysilane, N-2-aminoethyl-3-aminopropyltris(2-ethylhexoxy)silane, 6-(aminohexylaminopropyl)trimethoxysilane, aminomethyltrimethylsilane, aminophenyltrimethoxysilane, 3-(1-aminopropoxy)-3,3-dimethyl-1-propenyltrimethoxysilane, 3-aminopropyldiethylmethylsilane, 3-aminopropyltris(methoxyethoxyethoxy)silane, 3-aminopropyldimethylethoxysilane, 3-aminopropylmethyldiethoxysilane, 3-aminopropyltriethoxysilane, 3-aminopropyltrimethoxysilane, 3-aminopropyltris(trimethylsiloxy)silane and ω-aminoundecyltrimethoxysilane.

Surprisingly it has been found that amines of the general formula V or VI can likewise be employed, and lead to the self-curing of the systems according to the invention. The use of these amines offers the great advantage that the amine component can, via the silane moiety during hydrolysis and condensation, be incorporated into the inorganic network, where it becomes firmly anchored. Therefore no free amines are present after curing, and no toxicological problems occur in this respect. The systems according to the invention using amines of the formula V or VI are therefore particularly suitable for use in the medical sector.

When amines of the formula V or VI are used, the great advantage of the systems according to the invention consists in the fact that both the amino silanes and the reactive monomers of the formula I are firmly anchored in the inorganic-organic network after curing; in other words, they are chemically bonded and thus no longer present in free form, and are therefore toxicologically acceptable. The combination of reactive monomers of the formula I with amino silanes of the formula V or VI therefore offers quite considerable toxicological advantages over the prior art.

Dyes, UV absorbers, biomolecules, fillers or other additives can be introduced into the systems according to the invention simply by admixing them with the components 1 and/or 2. However, it is also possible to bond these additives covalently to the amine of component 2 in order thus to introduce them into the system according to the invention. In this case either the amine of component 2 can be modified in the manner just described, or else component 2 additionally comprises modified amine. In addition to functionalization within the crosslinking component (i.e. the crosslinking amine), there is therefore the additional possibility of bringing additional functional groups into the system by means of a noncrosslinking constituent—in other words, one which is not active in curing—of component 1 or 2, for example by way of a monoamine. Examples of functionalized, crosslinking amines for raising the $n_D$ are $C_6H_5$—$NH_2$ or $C_6H_5$—$S$—$C_6H_4$—$NH_2$.

In an analogous manner, it is possible to introduce functionality into the systems according to the invention by way of functionalized (meth)acrylates.

Thus a rich potential is available for providing an extremely wide variety of covalently and nucleophilically self-curing systems and for varying their profile of properties within wide limits. Thus, for example, the crosslinking density can be adjusted by way of component 1 (e.g. via the number of (meth)acrylate groups) or by way of component 2 (e.g. via the number of amino groups) in order thereby, for example, to adapt the mechanical properties of the cured systems according to the invention to the requirements of the particular application. Furthermore, by way of functional groups present in components 1 or 2, a wide variety of functionalities (e.g. UV-absorbing, colored, $n_D$-raising/lowering, etc.) can be incorporated into the systems according to the invention. In addition, the structure of the crosslinking amine (chain length, rigid, flexible, etc.) represents a further available instrument for exerting the desired effect on the properties of the systems according to the invention. The rate of reaction with respect to the addition reaction, and thus with respect to curing, can also be varied within wide limits. Thus, for example, primary amino groups react spontaneously and vigorously when placed together with acrylate groups, whereas secondary amino groups react only very slowly with methacrylates at room temperature or react only at higher temperatures. Adaptation to a variety of processing techniques is therefore possible.

Furthermore, one or both components of the covalently and nucleophilically self-curing systems according to the invention may comprise monomers which are capable of undergoing thermal and/or radiation-induced copolymerization. Particular preference is given to spiro orthoesters, spiro orthocarbonates, bicyclic spiro orthoesters, mono- or oligoepoxides, epoxysilanes or vinyl ethers.

It is also possible to add to one or both components of the systems according to the invention monomers which are capable of undergoing self-curing copolymerization.

The silanes of the general formula I are processed, either alone or together with other hydrolytically condensable and, if desired, polymerizable components, by hydrolytic condensation to give the covalently and nucleophilically self-curing systems according to the invention, whose ultimate curing is then carried out by an organic-ionic polyaddition reaction of the amino groups of component <u>2</u> onto the reactive C=C double bonds of the radicals B of component <u>1</u>, and, if desired, by polymerization of polymerizable groups; in this context, in the case of the silanes of the general formula I, this polymerization proceeds via linkage of the C=C double bonds of the radicals B and, in the case of the Spiro silanes of the general formula VIII, via a ring opening of the 1,4,6-trioxaspiro[4.4]nonane groups.

The silanes of the general formulae I, VII (which may also contain polymerizable groups such as, for example, C=C or epoxy groups) and VIII, and, for example, titanium, zirconium and aluminum compounds of the general formulae IX and X, contain hydrolyzable groups X and/or R°, for example alkoxy groups, by means of which an inorganic network is constructed in the course of the hydrolytic condensation, whereas the C=C double bonds present in the radical B or the spiro groups present in the radical Y form an organic network in the course of the polymerization or, respectively, polyaddition reaction. The inorganic network can be additionally modified by the addition of further hydrolytically condensable compounds, and the organic network by the addition of further copolymerizable compounds. The cured systems according to the invention consequently form an inorganic-organic matrix into which further components, for example fillers or pigments, can be incorporated if required.

In order to construct the inorganic network and/or to prepare the covalently and nucleophilically self-curing systems according to the invention, the silanes of the general formula I are subjected to polycondensation and hydrolysis by the action of water or moisture, if desired with the addition of the silanes of the formula VII and/or VIII and of other cocondensable components and, if desired, in the presence of a catalyst and/or of a solvent. This polycondensation is preferably carried out by the sol-gel process as described, for example, in DE-A 2758414, 2758415, 3011761, 3826715 and 3835968, and it takes place in the presence of Spiro compounds (silanes of the general formula VIII, copolymerizable spiro orthoesters, spiro orthocarbonates, bicyclic spiro orthoesters or methacryloyl spiro orthoesters) preferably in basic medium, but can also be carried out in acidic medium.

The compounds of formula I are prepared, e.g., by the synthesis of an acrylate with a mercaptoalkyldialkoxy silane. In the next step, they are completely hydrolyzed and subsequently condensed.

By "optionally (pre)condensed" is meant those optional variations of the synthesis in which a compound of formula I is not yet condensed, e.g., before any water is added. Further, the addition of water may be optionally carried out by adding water first to only a part of the compound or by first adding only part of the water, and then carrying out the remainder of the synthesis. Thus, the invention is not restricted to a specific condition, as for example, monomer or condensed forms of formula I compounds.

The preparation of the covalently and nucleophilically self-curing systems according to the invention can be carried out in a manner which is customary in the area of poly (hetero)condensation products. If almost exclusively silicon compounds are employed, the hydrolytic condensation can in most cases be carried out by adding the necessary water directly (preferably with stirring and in the presence of a hydrolysis and condensation catalyst), at room temperature or with slight cooling, to the silicon compounds to be hydrolyzed, which are present either as such or in solution in a suitable solvent, and by subsequently stirring the resulting mixture for some time (from one to two or more hours).

In the presence of reactive compounds of the Al, Ti or Zr series, which may also be present in complexed form, it is generally advisable to add the water in portions. Irrespective of the reactivity of the compounds present, the hydrolysis is generally carried out at temperatures of between −20 and 130° C., preferably between 0 and 30° C. or the boiling point of the solvent which may be employed. As already indicated, the best way of adding water depends above all on the reactivity of the starting compounds employed. Thus, for example, the dissolved starting compounds can be added slowly dropwise to an excess of water, or water is added in one or more portions to the starting compounds, which may be dissolved. It may also be useful not to add the water as such but to introduce it into the reaction system by means of organic or inorganic systems which contain water. In many cases it has proven particularly suitable to introduce the quantity of water into the reaction mixture by means of moisture-laden adsorbents, for example molecular sieves, and by means of aqueous organic solvents, for example 80% strength ethanol. The addition of water can also be made, however, by means of a chemical reaction in which water is liberated during reaction. Examples of such reactions are esterifications.

Suitable solvents—if a solvent is used—are, in addition to the lower aliphatic alcohols (for example ethanol or isopropanol), ketones, preferably lower dialkyl ketones such as acetone or methyl isobutyl ketone; ethers, preferably lower dialkyl ethers such as diethyl ether or dibutyl ether; THF; amides; esters, especially ethyl acetate; dimethylformamide; amines, especially triethylamine; and mixtures thereof.

If spiro silanes of the general formula VIII are employed for the preparation of the covalently and nucleophilically self-curing systems according to the invention, then the hydrolysis is preferably carried out in a medium which is basic with respect to these silanes. This medium is produced either by a basic solvent, for example by triethylamine, or by the addition of basic hydrolysis and condensation catalysts, for example $NH_3$, NaOH, KOH, methylimidazole, etc.

The starting compounds need not necessarily all be present at the start of hydrolysis (polycondensation); rather, in certain cases it may even be advantageous if only some of these compounds are initially brought into contact with water, and the remaining compounds are added subsequently.

In order as far as possible to prevent precipitation during the hydrolysis and the polycondensation, especially when using hydrolyzable compounds other than silicon compounds, it is possible to add the water in a number of stages, for example in three stages. In the first stage, for example, a tenth to a twentieth of the quantity of water required for the hydrolysis can be added. After stirring briefly the addition of a fifth to a tenth of the quantity of water required can be carried out, and finally, after further brief stirring, the remainder can be added.

The condensation time depends on the particular starting components and on their proportions, on any catalyst used, on the reaction temperature, etc. The polycondensation reaction is generally carried out at atmospheric pressure, although it can also be carried out at elevated or at reduced pressure.

The resulting polycondensation product is stable on storage and can be employed as component 1 in the systems according to the invention either as such or after partial or virtually complete removal of the solvent used or of the solvent formed during the reaction. In some cases it may prove advantageous, in order to stabilize the polycondensation product, to employ a different solvent to replace the excess water present in the product obtained after the polycondensation reaction and the solvent formed and any solvent additionally employed. For this purpose the reaction mixture can be thickened, for example in vacuo at slightly elevated temperature (up to a maximum of 80° C.) to a point where it can subsequently be taken up in another solvent without problem.

In order to construct the organic network and/or to cure the systems according to the invention the polycondensation product, following the addition if desired of other copolymerizable compounds and of fillers and of other additives, is subjected to a polyaddition reaction and, if desired, to an addition polymerization, in which case, given the addition of appropriate monomers, the self-curing (polyaddition) is also accompanied by a thermal and/or radiation-induced curing. The ultimate curing of the systems according to the invention is carried out by mixing the two components 1 and 2. In this case, as part of an organic-ionic polyaddition reaction, the amino groups of component 2 are linked with the C=C double bonds of the silanes of the formula I and, if silanes of the general formula VIII are present, the rings of the spiro groups are opened as part of a cationic addition polymerization.

It is also possible to add further ionically or free-radically polymerizable compounds to the systems according to the invention prior to the ultimate curing, in other words prior to the polyaddition reaction. Free-radically polymerizable monomers which can be added are, for example, those containing C=C double bonds, for instance acrylates or methacrylates, where addition polymerization takes place via the C=C double bonds. Ionically polymerizable compounds which can be added contain, for example, ring systems which can be polymerized by cationic, ring-opening mechanism, for example spiro orthoesters, spiro orthocarbonates, bicyclic spiro orthoesters, monoepoxides or oligoepoxides. However, compounds can also be added which can be polymerized both by a cationic and by a free-radical mechanism, examples being methacryloyl Spiro orthoesters. These compounds are polymerizable free-radically via the C=C double bond and cationically with ring opening. These systems are described in, for example, Journal f. prakt. Chemie, 330:316 (1988) or in the Journal of Polymer Science: Part C: Polymer Letters, 26: 517 (1988).

If the self-curing of the systems according to the invention is accompanied by photochemical curing, then conventional cationic photoinitiators are added to at least one of the two components of the systems according to the invention. Suitable photoinitiators of the prior art are, for example, compounds which release acids on irradiation, for instance $C_6H_5$—$N_2BF_4$, o—$NO_2$—$C_6H_4$—$CH_2$—$O$—$SO_2$—$CF_3$ or triarylsulfonium salts of the general formulae below, in which the radicals Ar may be identical or different and are aryl or arylene, for example phenyl or phenylene, with X being $BF_4^-$, $AsF_6^-$, $PF_6^-$ or $SbF_6^-$.

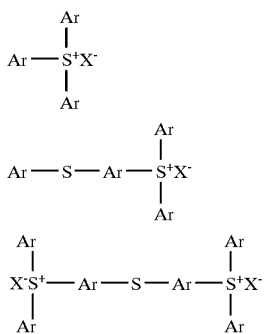

These photoinitiators are available commercially. For example, Union Carbide supply triphenylsulfonium hexafluorophosphate as a 50% strength solution in propylene carbonate under the trade name UVI-6990, while Degussa supply KI-85 (an initiator of the last formula, where Ar=phenyl or phenylene and $X^-=PF_6^-$, as a 50% strength solution in propylene carbonate). In principle, suitable photoinitiators are all those which can be employed for the polymerization of oxirane-containing molecules such as, for example, cycloaliphatic epoxides.

Under the effect of irradiation, the triarylsulfonium salt undergoes photolysis, to produce a Bronsted acid which catalyzes the ring opening of the spiro groups, whereupon the composition polymerizes.

If the self-curing of the systems according to the invention is also accompanied by thermal curing, then thermal initiators are added to at least one component of the system according to the invention. Examples of suitable thermal initiators are $BF_3$ in the form of $BF_3.H_2NC_2H_5$, $ZnCl_2$, $TiCl_4$ or $SnCl_2$. Here too it is also possible to employ all of the thermal initiators which are suitable for the polymerization of epoxide groups.

The initiators are added in conventional quantities.

Photoinitiators which can be employed are, for example, those which are available commercially. Examples of these are Irgacure 184 (1-hydroxycyclohexyl phenyl ketone), Irgacure 500 (1-hydroxycyclohexyl phenyl ketone/benzophenone) and other photoinitiators of the Irgacure type available from Ciba-Geigy; Darocure 1173, 1116, 1398, 1174 and 1020 (available from Merck), benzophenone, 2-chlorothioxanthone, 2-methylthioxanthone, 2-isopropylthioxanthone, benzoin, 4,4'-dimethoxybenzoin, camphorquinone, and others.

Suitable thermal initiators are, in particular, organic peroxides in the form of diacyl peroxides, peroxydicarbonates, alkyl peresters, dialkyl peroxides, perketals, ketone peroxides and alkyl hydroperoxides. Concrete and preferred examples of thermal initiators are dibenzoyl peroxide, t-butyl perbenzoate and azobisisobutyronitrile.

The inorganic network is responsible for the fact that, even without the addition of fillers, the cured systems according to the invention have an excellent abrasion resistance and dimensional stability, and the formation of the organic network causes a small or even negative volume shrinkage. With the addition of silanes of the general formula VIII, the number of spiro groups in the systems according to the invention, that is the nature and/or quantity of the spiro silanes of the general formula VIII which are employed, can be used to adapt the change in volume during the curing operation to the requirements of the particular application. The greater the number of spiro groups, the smaller the volume shrinkage. Indeed it is even possible to influence the volume change during the curing operation in such a way that an increase in volume results.

The covalently and nucleophilically self-curing systems according to the invention may be processed either as such or together with conventional additives such as, for example, fillers, adhesion promoters or pigments. In this context the advantageous properties of the cured systems according to the invention can be enhanced even further by addition of fillers, thereby resulting in materials whose profile of properties is a very considerable improvement on the prior art, and which are able to meet all of the requirements placed on such materials.

Examples of fillers which can be employed are macro-fillers (of glass, ceramic or quartz, particle sizes between 2 and 50 $\mu$m), homogeneous microfillers (for example of pyrogenic silica, particle sizes about 0.04 $\mu$m), inhomogeneous microfillers (part of the pyrogenic silica is in the form of fragmented polymer), hybrid fillers (mixture of macro-fillers and microfillers) or ultrafine hybrid fillers (for example a mixture of Aerosil and Ba glass or Sr glass with particle sizes of 2 $\mu$m). The mechanical properties of the resulting, cured systems are affected inter alia by the particle size and quantity of the fillers. The addition of fillers also has a further positive effect on shrinkage (the higher the filler content of a given matrix, the lower the shrinkage), X-ray opacity (by addition of e.g. Ba, Sr, Ti or Zr components in the filler) and the coefficient of thermal expansion (dependent on the filler content; fillers commonly have a lower expansion coefficient than the organic matrix).

It is also possible to add cured systems according to the invention in finely divided form, as filler, to the uncured systems according to the invention. For this purpose the systems according to the invention are cured by polyaddition reaction and, if desired, by addition polymerization. The cured product is dried, ground finely if desired, and admixed with the systems according to the invention.

A further possibility is first of all to precrosslink some of the C=C double bonds of component 1 with the amine of component 2 (e.g. targeted precrosslinking or precuring) and subsequently to carry out thermal curing or curing by irradiation with UV and/or visible light. By this means, as compared with the prior art, part of the very close-knit (meth)acrylate crosslinking is replaced by a more open, variable amine crosslinking. This makes it possible to exert a targeted effect on, for example, the mechanical properties, for instance an increase in the impact toughness, an increase in the adjustment range of the modulus of elasticity, etc.

It is also possible, by the addition of defined, very small quantities of component 1 to component 2 or vice versa, to create a small number of crosslinking sites, in order thereby to bring about a specific increase in the molecular weight and the viscosity of the systems according to the invention.

Yet another possibility is a combination with epoxy-, isocyanate- or anhydride-containing systems or with other systems which are suitable for reaction with amino groups.

The systems according to the invention are illustrated in more detail with reference to exemplary embodiments.

EXAMPLE GROUP 1

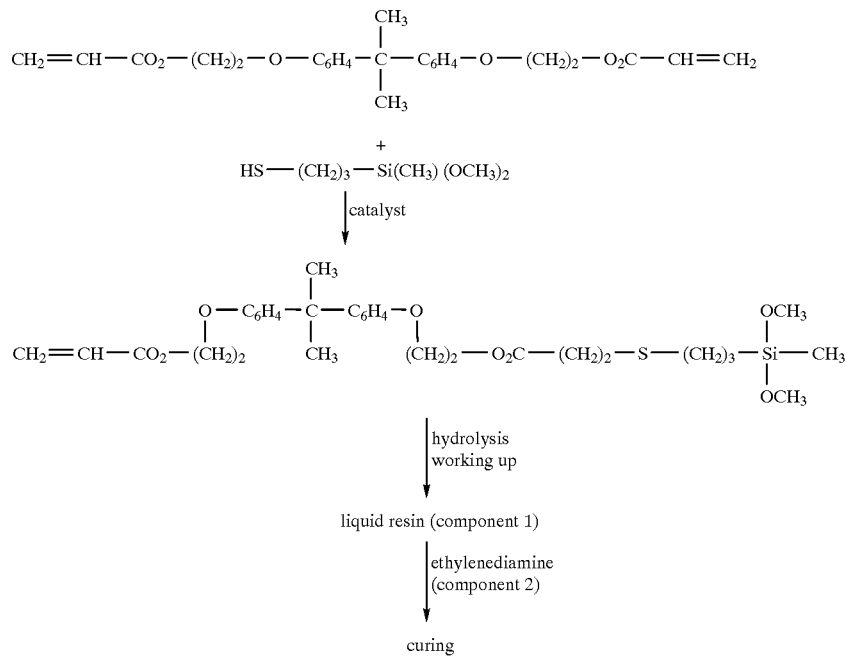

Synthesis:

Mercaptopropylmethyldimethoxysilane (36.1 g, 0.2 mol) is added dropwise under a protective gas atmosphere to the initial charge of 84.8 g (0.2 mol) of ethoxylated bisphenol A diacrylate in 200 ml of ethyl acetate. 12.6 g of an ethanolic KOH solution are slowly added dropwise with cooling. The reaction (thioladdition) is over after about 5 minutes. HCl (5.8 g of 0.5N) is added dropwise for hydrolysis and condensation of the methoxy groups. After stirring for about 1 day at room temperature the reaction mixture is extracted by shaking with water, and filtered, the filtrate is concentrated on a rotary evaporator, and all of the volatile constituents are removed using an oil pump. The clear resin (component 1) is obtained in a yield of about 95% and can be employed in this form for the subsequent curing operation.

Curing:

1st Example

Component 1 (4.1 g) and 0.44 g of component 2 (ethylenediamine) are dissolved with one another at room temperature in a molar ratio of 1:0.5 (1 C=C:1 $NH_2$) and the solution is placed in a curing mold (Ø=2 cm; d=2 mm). After about 3 minutes the sample is solid (rubbery).

2nd Example

Component 1 (4.0 g) and 0.35 g of component 2 (ethylenediamine) are dissolved with one another at room temperature in a molar ratio of 1.2:0.5 (1.2 C=C:1 $NH_2$) and the solution is placed in a curing mold (Ø=2 cm; d=2 mm). After about 3 minutes the sample is solid (rubbery). The reaction is over after about 1.5 hours (with post-curing at 80–100° C.).

EXAMPLE GROUP 2

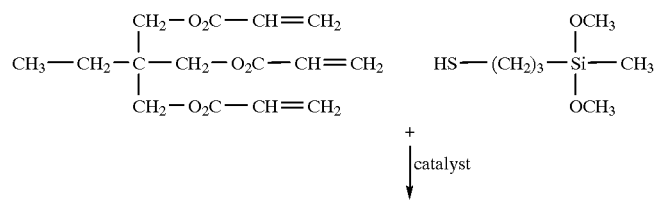

-continued

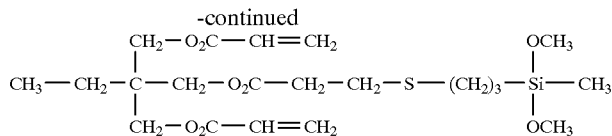

hydrolysis
working up liquid resin (component 1)

ethylenediamine (component 2)

curing

Synthesis:

Mercaptopropylmethyldimethoxysilane (36.1 g, 0.2 mol) is added dropwise under a protective gas atmosphere to the initial charge of 19.3 g (0.2 mol) of trimethylolpropane triacrylate (TMPTA) in 200 ml of ethyl acetate. 12.6 g of an ethanolic KOH solution are slowly added dropwise with cooling. The reaction (thioladdition) is over after about 5 minutes. 5.8 g of 0.5N HCl are added dropwise for hydrolysis and condensation of the methoxy groups. After stirring for about 1 day at room temperature the reaction mixture is extracted by shaking with water, and filtered, the filtrate is concentrated on a rotary evaporator, and all of the volatile constituents are removed using an oil pump. The clear resin (component 1) is obtained in a yield of about 97% and can be employed in this form for the subsequent curing operation.

Curing:

1st Example

Component 1 (5.1 g) and 0.64 g of component 2 (ethylenediamine) are dissolved with one another at room temperature in a molar ratio of 1.1:1 (1.1 C=C:1 $NH_2$) and the solution is placed in a curing mold (Ø=2 cm; d=2 mm). After about 1 minute the sample is solid (flexible).

2nd Example

Component 1 (18.2 g) and 0.64 g of component 2 (ethylenediamine) are dissolved with one another at room temperature in a molar ratio of 4:1 (4 C=C:1 $NH_2$) and the solution is placed in a curing mold (Ø=2 cm; d=2 mm). After about 4 minutes the mixture gels, and after about ½ an hour the sample is solid (flexible). The residual double bonds (amine in excess) are available for other polymerization reactions (e.g. UV-induced free-radical polymerization).

3rd Example

Component 1 (15.1 g) and 0.21 g of component 2 (ethylenediamine) are dissolved with one another at room temperature in a molar ratio of 10:1 (10 C=C:1 $NH_2$) and the solution is placed in a curing mold (Ø=2 cm; d=2 mm). After about 1.25 hours the mixture gels and after about 3 hours the sample is solid (flexible). The residual double bonds (amine in excess) are available for other polymerization reactions (e.g. UV-induced free-radical polymerization).

4th Example

Combination of Self-curing with a UV-induced Free-radical Polymerization

Component 1 (15.2 g plus 1% Irgacure 184, UV initiator from Ciba-Geigy) and 0.21 g of component 2 (ethylenediamine) are dissolved with one another at room temperature in a molar ratio of 10:1 (10 C=C:1 $NH_2$) and the solution is placed in a rod mold (2×2×20 mm). After about 3 hours the sample is solid (flexible). The residual double bonds (amine in excess) are reacted in a UV-induced free-radical polymerization. For this purpose the "self-cured" rods are irradiated on both sides for 100 seconds in each case with a UV point radiator from Honle. The modulus of elasticity of the resulting rod is determined by means of a 3-point bending test: modulus of elasticity=900 MPa (±93)

For comparison, the modulus of elasticity of a sample (having the same dimensions) obtained only by UV curing and without the addition of amine was: modulus of elasticity=1520 MPa (±67)

By incorporating a number of long-chain cross-linking sites (10 mol % of aliphatic diamine) in comparison with the purely closely-knit free-radical cross-linking of the acrylate groups, a drastic effect is observed on the mechanical properties. As a result of this measure the modulus of elasticity falls from 1520 MPa to 900 MPa, and therefore the flexibility of the material is increased considerably. The result of this is the possibility of varying, for example, the mechanical properties of the materials based on the (meth) acrylate alkoxysilanes within broad limits, by modification with amines of different structures.

EXAMPLE GROUP 3

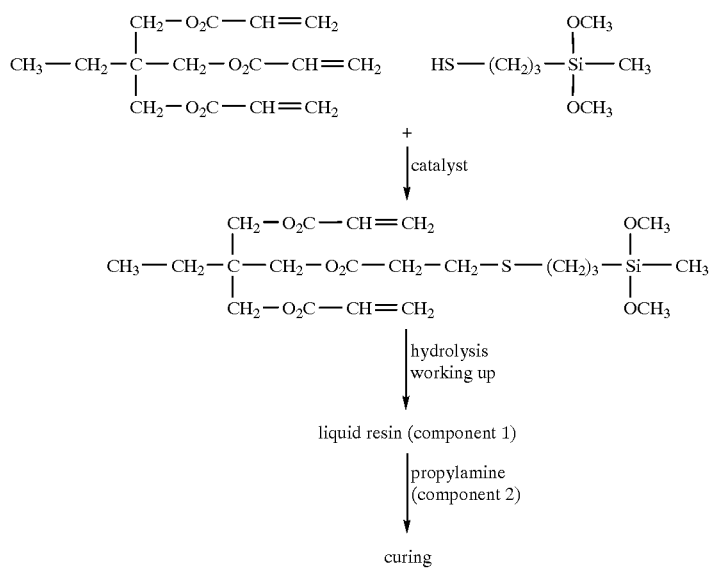

Synthesis:

Mercaptopropylmethyldimethoxysilane (36.1 g, 0.2 mol) is added dropwise under a protective gas atmosphere to the initial charge of 19.3 g (0.2 mol) of trimethylolpropane triacrylate (TMPTA) in 200 ml of ethyl acetate. 12.6 g of an ethanolic KOH solution are slowly added dropwise with cooling. The reaction (thioladdition) is over after about 5 minutes. 5.8 g of 0.5N HCl are added dropwise for hydrolysis and condensation of the methoxy groups. After stirring for about 1 day at room temperature the reaction mixture is extracted by shaking with water, and filtered, the filtrate is concentrated on a rotary evaporator, and all of the volatile constituents are removed using an oil pump. The clear resin (component 1) is obtained in a yield of about 97% and can be employed in this form for the subsequent curing operation.

Curing:

Component 1 (3.22 g) and 0.44 g of component 2 (propylamine) are dissolved with one another at room temperature in a molar ratio of 1:1 (2 C=C:1 $NH_2$) and the solution is placed in a curing mold (Ø=2 cm; d=2 mm). After about 2 hours the mixture gels, and after about 18 hours it is tack-free (hard and of low flexibility).

In this case, surprisingly, there is a 2-fold addition of the amino groups. Addition takes place first of all to the secondary amine, and the second addition to the tertiary amine takes place during further curing.

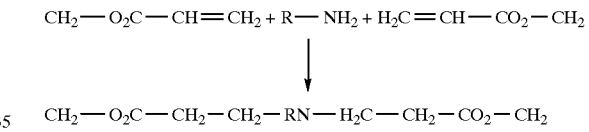

This results in a very short-chain crosslinking of the acrylate groups, and thus the material is no longer highly flexible, as in the 4th example of Example group 2, but has a high modulus of elasticity.

This resin matrix therefore leads to a polymer having very different mechanical properties, which can be adjusted by means of differently substituted amines.

EXAMPLE GROUP 4

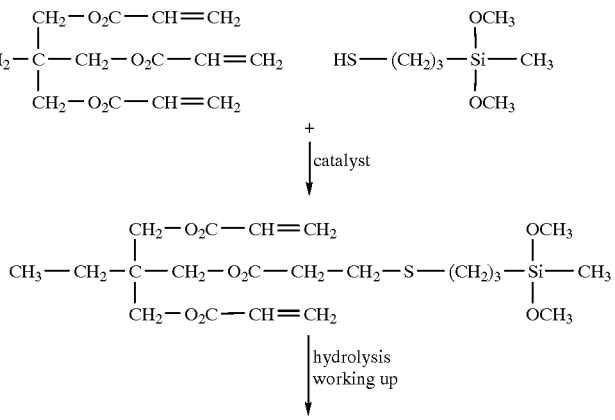

-continued liquid resin (component 1)

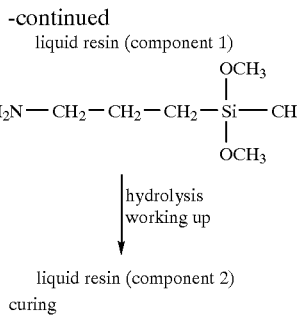

hydrolysis
working up liquid resin (component 2)

component 1 + component 2 ⟶ curing

Synthesis:

Component 1

Mercaptopropylmethyldimethoxysilane (36.1 g, 0.2 mol) is added dropwise under a protective gas atmosphere to the initial charge of 19.3 g (0.2 mol) of trimethylolpropane triacrylate (TMPTA) in 200 ml of ethyl acetate. 12.6 g of an ethanolic KOH solution are slowly added dropwise with cooling. The reaction (thiol addition) is over after about 5 minutes. 5.8 g of 0.5N HCl are added dropwise for hydrolysis and condensation of the methoxy groups. After stirring for about 1 day at room temperature the reaction mixture is extracted by shaking with water, and filtered, the filtrate is concentrated on a rotary evaporator, and all of the volatile constituents are removed using an oil pump. The clear resin (component 1) is obtained in a yield of about 97% and can be employed in this form for the subsequent curing operation.

Component 2

Water (5.8 g, incl. catalyst) are added dropwise to the initial charge of 38.3 g (0.2 mol) of aminopropylmethyldimethoxysilane in 100 ml of ethyl acetate for hydrolysis and condensation of the methoxy groups. After stirring for about 1 day at room temperature the mixture is concentrated on a rotary evaporator and all of the volatile constituents are removed using an oil pump. The clear resin (component 2) is obtained in a yield of about 95% and can be employed in this form for the subsequent curing operation.

Curing:

Component 1 (5.0 g) and 2.7 g of component 2 are dissolved with one another at room temperature in a molar ratio of 1:2 (1 C=C:1 $NH_2$) and the solution is placed in a curing mold (Ø=2 cm; d=2 mm). After about 2 minutes the mixture gels, and after a short time it is tack-free.

The rate of reaction, i.e. the processing time following the combination of components 1 and 2, can be controlled by the selection of the temperature (cooling, heating), by the reactivity of the amine component (basicity, steric conditions, etc.) and by the reactivity of component 1 (e.g. methacrylic and acrylic groups, number of double bonds, etc.).

The invention has been described by reference to preferred embodiments and example. Those skilled in the art recognize that various modifications may be made to the invention in that departing from the spirit and scope thereof.

What is claimed is:

1. A covalently and nucleophilically self-curing system based on polymerizable and hydrolytically condensable or hydrolytically condensed silicon compounds, comprising a component 1 and a component 2, wherein said component 1 comprises one or more silicon compounds of the formula I, optionally in hydrolytically (pre)condensed form, $$\{X_aR_bSi[(R'A)_c]_{(4-a-b)}\}_xB \qquad (I)$$

in which the radicals and integers are identical or different and:

A is O, S, PR", POR", NHC(O)O or NHC(O)NR",

B is a straight-chain or branched organic radical which is a chemical derivative of a compound B' having at least one C=C double bond when c=1 and A=NHC(O)O or NHC(O)NR" or at least two C=C double bonds, and 5 to 50 carbon atoms, R is alkyl, alkenyl, aryl, alkylaryl or arylalkyl, R' f is alkylene, arylene or alkylene arylene, R" is hydrogen, alkyl or aryl, X is hydrogen, halogen, hydroxyl, alkoxy, acyloxy, alkylcarbonyl, alkoxycarbonyl or $NR"_2$, wherein:

a is 1, 2 or 3 b is 0, 1 or 2 c is 0 or 1, and x is an integer whose maximum value corresponds to the number of double bonds in the compound B' minus 1, or is equal to the number of double bonds in the compound B' if c=1 and A is NHC(O)O or NHC(O)NR", and wherein component 2 comprises one or more compounds selected from the group consisting of:

a diamine of general formula (II):

$$R"_2N—R^3—NR"_2 \qquad (II)$$

wherein the radicals R" are identical or different and are hydrogen, alkyl or aryl, $R^3$ is an optionally substituted alkylene, arylene, arylenealkylene or alkylenearylene radical having 1 to 20 carbon atoms, which is straight-chain, branched or cyclic, and in which aryl is optionally substituted phenyl, naphthyl or biphenyl, and wherein the amino groups are located on one carbon atom or on different carbon atoms; a triamine of general formula (III)

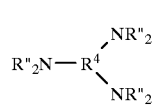

(III)

wherein the radicals R" are identical or different and are hydrogen, alkyl or aryl, $R^4$ is an optionally substituted alkylene, arylene, arylenealkylene or alkylenearylene radical having 1 to 20 carbon atoms, which is straight-chain, branched or cyclic, in which aryl is optionally substituted phenyl, naphthyl or biphenyl, and wherein the amino groups are located on three carbon atoms, on two carbon atoms or on one carbon atom; tetraamine of general formula (IV)

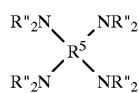 (IV)

wherein the radicals R" are identical or different and are hydrogen, alkyl or aryl, $R^5$ is an optionally substituted alkylene, arylene, arylenealkylene or alkylenearylene radical having 1 to 20 carbon atoms, which is straight-chain, branched or cyclic, in which aryl is optionally substituted phenyl, naphthyl or biphenyl, and wherein the amino groups are located on four, on three or on two different carbon atoms; an amine of general formula (V), optionally in hydrolytically (pre)condensed form

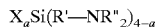 (V)

wherein the radicals X, R' and R" are identical or different and are defined above with integer a being 1, 2 or 3; and, an amine of general formula (VI), optionally in hydrolytically (pre)condensed form

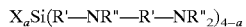 (VI)

in which the radicals X, R' and R" are identical or different and are defined above, with integer a being 1, 2 or 3; and wherein said system optionally comprises one or more conventional additives or fillers, additional copolymerizable monomers or oligomers, additional hydrolytically condensable or condensed compounds of silicon, and other elements selected from the group consisting of Al, Ti, Zr, B, P, Sn, Pb, the transition metals, the lanthanides and the actinides.

2. A covalently and nucleophilically self-curing system as claimed in claim 1, wherein in the general formula I the radicals and integers are defined as follows:

X=($C_1$–$C_4$)-alkoxy,
R=($C_1$–$C_4$)-alkyl,
R'=($C_1$–$C_4$)-alkylene,
A=O, S, NHC(O)O, or NHC(O)NR";
a=1, 2 or 3;
c=0 or 1;
4-a-b=0 for c=0 and 1 for c=1;
B=as defined in claim 1; and
x=as defined in claim 1.

3. A covalently and nucleophilically self-curing system as claimed in claim 1, wherein in the general formula I the unit with the integer x is selected from the group consisting of triethoxysilyl, methyldiethoxysilyl, methyldichlorosilyl, 3-methyldimethoxysilylpropylthio, 3-triethoxysilylpropylthio, ethoxydimethylsilylmethylthio, methyldiethoxysilylmethylthio and 3-triethoxysilylpropyl urethane.

4. A covalently and nucleophilically self-curing composition system as claimed in claim 1, wherein in the general formula I, B is derived from a substituted or unsubstituted compound B' having two or more acrylate or methacrylate groups or a combination thereof.

5. A covalently and nucleophilically self-curing system as claimed in claim 4, wherein in the general formula I, B is derived from acrylic esters of a compound selected from the group consisting of trimethylolpropane, pentaerythritol, dipentaerythritol, $C_2$–$C_4$-alkanedioles, polyethylene glycols, polypropylene glycols, and optionally substituted or alkoxylated bisphenol A.

6. A covalently and nucleophilically self-caring system according to claim 1, wherein component 2 comprises a primary or secondary diamine compound.

7. A covalently and nucleophilically self-curing system as claimed in claim 6, wherein component 2 comprises one or more diamines of the general formula (II)

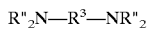 (II)

wherein the radicals R" are identical or different and are hydrogen, alkyl or aryl, $R^3$ is an optionally substituted alkylene, arylene, arylenealkylene or alkylenearylene radical having 1 to 20 carbon atoms, which is straight-chain, branched or cyclic, and in which aryl is optionally substituted phenyl, naphthyl or biphenyl, and wherein the amino groups are located on one carbon atom or on different carbon atoms.

8. A covalently and nucleophilically self-curing system as claimed in claim 6, wherein component 2 comprises one or more triamines of the general formula (III)

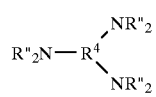 (III)

wherein the radicals R" are identical or different and are hydrogen, alkyl or aryl, $R^4$ is an optionally substituted alkylene, arylene, arylenealkylene or alkylenearylene radical having 1 to 20 carbon atoms, which is straight-chain, branched or cyclic, in which aryl is optionally substituted phenyl, naphthyl or biphenyl, and wherein the amino groups are located on three carbon atoms, on two carbon atoms or on one carbon atom.

9. A covalently and nucleophilically self-curing system as claimed in claim 6, wherein component 2 comprises one or more tetraamines of the general formula

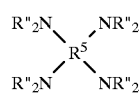 (IV)

wherein the radicals R" are identical or different and are hydrogen, alkyl or aryl, $R^5$ is an optionally substituted alkylene, arylene, arylenealkylene or alkylenearylene radical having 1 to 20 carbon atoms, which is straight-chain, branched or cyclic, in which aryl is optionally substituted phenyl, naphthyl or biphenyl, and wherein the amino groups are located on four, on three or on two different carbon atoms.

10. A covalently and nucleophilically self-curing system as claimed in claim 1, wherein component 2 comprises one or more silanes of the general formula (V), optionally in hydrolytically (pre)condensed form,

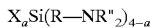 (V)

wherein the radicals X, R" are identical or different and are defined in claim 1, with integer a being 1, 2 or 3.

11. A covalently and nucleophilically self-curing system as claimed in claim 1, wherein component 2 comprises one or more silanes of the general formula (VI), optionally in hydrolytically (pre)condensed form $$X_aSi(R'-NR''_2)_{4-a} \quad \text{(VI)}$$

in which the radicals X, R' and R" are identical or different and are defined in claim 1, with integer a being 1, 2 or 3.

12. A self-curing system according to claim 1, wherein said amine compound of component 2 comprises an amino compounds to which is covalently bonded a dye, a UV absorber or a biologically active molecule.

13. A covalently and nucleophilically self-curing system as claimed in claim 1, wherein components 1 or 2 or both, comprise further one or more hydrolytically condensable compounds of silicon of the general formula (VII), optionally in hydrolytically (pre)condensed form $$R_x(R^2Z)_ySiX_{4-(x+y)} \quad \text{(VII)}$$

wherein the radicals and integers are identical or different and are defined as follows:

R=alkyl, alkenyl, aryl, alkylaryl or arylalkyl, $R^2$=alkylene or alkenylene, optionally substituted by oxygen or sulfur atoms or —NH groups, R"=hydrogen, alkyl or aryl, X=hydrogen, halogen, hydroxyl, alkoxy, acyloxy, alkylcarbonyl, alkoxycarbonyl or $NR''_2$, Z=halogen or an optionally substituted amino, amide, aldehyde, alkylcarbonyl, carboxyl, mercapto, cyano, alkoxy, alkoxycarbonyl, sulfonic acid, phosphoric acid, acryloyloxy, methacryloyloxy, epoxy or vinyl group, x=0, 1, 2 or 3, y=0, 1, 2 or 3, where x+y=1, 2 or 3.

14. A covalently and nucleophilically self-curing system as claimed in claim 1, wherein component 1 or 2 or both, comprise further one or more hydrolytically condensable compounds of silicon of the general formula VIII, optionally in hydrolytically (pre)condensed form $$Y_nSiX_mR_{4-(n+m)} \quad \text{(VIII)}$$

wherein the radicals and integers are identical or different and are defined as follows:

R=alkyl, alkenyl, aryl, alkylaryl or arylalkyl,

X=hydrogen, halogen, hydroxyl, alkoxy, acyloxy, alkylcarbonyl, alkoxycarbonyl or $NR''_2$, R"=hydrogen, alkyl, or aryl, Y=a substituent which contains a substituted or unsubstituted 1,4,6-trioxaspiro nonane radical, n=1, 2 or 3; and, m=1, 2 or 3, with n+m ≦4.

15. A covalently and nucleophilically self-curing system as claimed in claim 1, wherein components 1 or 2 or both, comprise further one or more hydrolytically condensable compounds of aluminum, titanium or zirconium, optionally in hydrolytically (pre) condensed form, of the general formula IX or X or both, $$\text{(IX)} \ AlR°_3 \qquad M\ X_kR_l \quad \text{(X)}$$

wherein the radicals and integers are identical or different and are defined as follows:

M=titanium or zirconium,

R°=halogen, hydroxyl, alkoxy or acyloxy, k=1, 2, 3 or 4, l=0, 1, 2 or 3,

X=as defined in general formula I; and

R=as defined in general formula I.

16. A self-curing system according to claim 1, wherein said system further comprises one or more conventional materials selected from the group consisting of additives, fillers, additional copolymerizable monomers or oligomers, additional hydrolytically c6condensable or condensed silicon compounds, and an element selected from the group consisting of Al, Zr, B, P, Sn, Pb, transitional metals, lanthanide and actinides.

17. A self-curing system according to claim 1, wherein X is methoxy, ethoxy or chlorine.

18. A self-curing system according to claim 1, wherein R is methyl or ethyl.

19. A self-curing system according to claim 1, wherein R' is methylene or ethylene.

20. A self-curing system according to claim 1, wherein k is 2, 3 or 4.

21. A self-curing system according to claim 1, wherein l is 0, 1 or 2.

22. A self-curing system according to claim 1, wherein said alkyl and alkenyl radicals are selected from the group consisting of substituted or unsubstituted straight chain, branched chain or cyclic radicals having 1 or 2–20 carbon atoms, respectively.

23. A self-curing system according to claim 1, wherein said aryl is phenyl, naphthyl or biphenyl.

24. A self-curing system according to claim 1 wherein said aryl moiety in R' or R" is, arylene or alkylenearylamine.

* * * * *

UNITED STATES PATENT AND TRADEMARK OFFICE
CERTIFICATE OF CORRECTION

PATENT NO. : 5,919,885  Page 1 of 1
DATED : July 6, 1999
INVENTOR(S) : Herbert Wolter et al.

It is certified that error appears in the above-identified patent and that said Letters Patent is hereby corrected as shown below:

Column 8,
Line 31, delete "$Zr(O\text{-}i\text{-}C_3H_7)_{41}$" and insert -- $Zr(O\text{-}i\text{-}C_3H_7)_4$, --.
Line 36, delete "$B(O_2H_5)_3$" and insert -- $B(OC_2H_5)_3$ --.

Column 19,
Line 22, delete "19.3" and insert -- 59.3 --.
Line 51, delete "(amine in excess)" and insert -- (amine in substoichiometric amount) --.

Column 20,
Line 22, delete "(amine in excess)" and insert -- (amine in substoichiometric amount) --.
Line 36, delete "(amine in excess)" and insert -- (amine in substoichiometric amount) --.

Signed and Sealed this

Twenty-second Day of April, 2003

JAMES E. ROGAN
*Director of the United States Patent and Trademark Office*